Patented June 21, 1938

2,121,064

UNITED STATES PATENT OFFICE 2,121,064

PRODUCTION OF CITRIC ACID

Justin Zender, Chauncey, N. Y., assignor to Stauffer Chemical Company, New York, N. Y., a corporation of California No Drawing. Application March 20, 1936,
Serial No. 69,975

7 Claims. (Cl. 195—36)

The invention relates in general to a process for the production of citric acid by mold fermentation and, in particular, to a process for producing citric acid by the mold fermentation of monosaccharides.

Heretofore it has been proposed to produce citric acid by the mold fermentation of various saccharides with the result that only poly- and disaccharides give reasonably good yields of citric acid. Sucrose lends itself admirably as a base from which citric acid may be produced by mold fermentation. Notwithstanding the high yield of citric acid from sucrose, the high cost of this sugar renders the process expensive. Attempts have been made to produce citric acid directly from monosaccharides, especially glucose, but without success from a commercial standpoint because when glucose is used it must be in an absolutely pure state. Glucose of the purity required is not obtainable in commercial quantities and, furthermore, it would be too costly if it were obtainable. It is practically impossible to ferment commercial glucose (corn sugar) directly to citric acid. It has now been found that the monosaccharides, especially glucose, may be successfully employed in the production of citric acid.

It is the general object of the present invention to produce citric acid by mold fermenting monosaccharides.

It is a specific object to produce citric acid by mold fermenting a monosaccharide, such as glucose, which is much cheaper and more abundant than sucrose.

Another object is to increase the efficiency of the process of producing citric acid by mold fermentation.

Other objects of the invention will in part be obvious and will in part appear hereinafter.

According to the invention citric acid is produced by fermenting a monosaccharide solution under a mycelium developed on a polysaccharide solution.

The invention accordingly comprises a process having the steps and the relation of steps one to another, all as exemplified in the following detailed description and the scope of the application of which will be indicated in the claims.

It is well known that, under favorable conditions, molds such as *Citromyces, Penicillium,* and especially *Aspergillus niger (Sterigmatocystis nigra)* will ferment a polysaccharide solution and produce citric acid in an amount up to and above 60% by weight of the polysaccharide in said solution. However, the mold fermentation of monosaccharide solutions directly has been found to be commercially unsuccessful as the citric acid obtained is contaminated with small amounts of impurities and the yield of citric acid is low. The mycelium grown on a monosaccharide solution is very thick, relatively inactive and the life of the same is very short, whereas the mycelium developed on a polysaccharide solution is thin, very active and has a long life. In this invention, advantage is taken of the proficuous mycelium developed on a polysaccharide solution to ferment a monosaccharide solution.

For a more complete understanding of the invention, a specific example of the process will be given, but it is understood that the invention is not limited to the process given in the example. A 15% aqueous sucrose solution containing suitable nutrient salts and having a pH value of about 3.3 is first inoculated with spores of *Aspergillus niger,* or the like, in a flat aluminum pan, the solution having preferably a maximum depth of 1 cm. After five or six days, the conversion of about 65% by weight of the sucrose into citric acid will have been completed and a mycelium of the desired character will have been formed on the solution. The citric acid solution is then carefully run out from under the mycelium, which is left intact in the pan, and a 15% aqueous solution of refined corn sugar, comprising 92–96% glucose, and suitable nutrient salts is run in under the mycelium before the latter dries out. This glucose solution may be fermented to citric acid within about three days, the yield of citric acid being about 60% to 65% by weight of the glucose in the original sugar solution. This citric acid solution is run out from under the mycelium and another batch of the original corn sugar solution is run in under the same mycelium. This operation of successively fermenting batches of the glucose solution to citric acid under the mycelium developed originally on the sucrose solution is continued as long as the acid-forming properties of the mycelium exist. When the activity of the mycelium has been exhausted, the cycle is started again by first developing a mycelium on a sucrose solution and using this mycelium to ferment successively various batches of corn sugar solution as above described.

The sugar content of the solutions may be varied from 12% to 30%, although it is preferable to use approximately a 15% solution. It is also preferable to have the depth of the polysaccharide solution in the pan not to exceed 1 cm., as the speed of the development of the mycelium is greater at or below this depth than above it. The depth of the monosaccharide solution in the pan may range from 1.5 to 3 cm. with a preferred depth of 2.5 cm. The temperature in the fermentation chambers should be maintained between about 31° C. and 35° C. and it is advantageous to limit the air circulation in the chambers.

The operations of withdrawing citric acid from under the mycelium and running in the sugar solution under the mycelium should be carried out very carefully so as not to disrupt the continuity of the mycelium, because the activity of the latter is impaired when it is broken or submerged in liquids. As many as four or five batches of a monosaccharide solution may be fermented under the same mycelium.

Any carbohydrate that is fermentable to citric acid may be used in the process of the invention. For growing the initial mycelium there may be employed any suitable polysaccharide such, for example, as sucrose, maltose, and the expression "polysaccharide" is intended to include the disaccharides. For the fermentation steps succeeding the initial growing of the mycelium there may be employed any suitable monosaccharide such, for example, as glucose, fructose, galactose, and the expression "monosaccharide" is used herein in its conventional meaning as defined in Bernthsen-Sudborough's "Textbook of Organic Chemistry", new edition 1931, pages 309 and 310. A refined corn sugar (glucose 92–96%) sold under the trade name of "Cerelose" has been found quite satisfactory for use in the present process.

In conventional fermentation processes each batch is inoculated with spores of the desired mold and the developed mold must be cleaned out from the apparatus after each batch has been fermented. Since, in the present process, several batches of the saccharide solutions are fermented under the same mycelium, the labor of cleaning out the mold from the apparatus is greatly reduced.

Since certain changes may be made in the process and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described and all statements of the scope of the invention which as a matter of language might be said to fall therebetween.

I claim:

1. A process for producing citric acid comprising mold fermenting a polysaccharide solution to citric acid, withdrawing the citric acid from under the developed mycelium, introducing a monosaccharide solution under the mycelium and fermenting this solution to citric acid.

2. A process for producing citric acid comprising mold fermenting a sucrose solution to citric acid, withdrawing the citric acid from under the developed mycelium, introducing a glucose solution under said mycelium and fermenting the glucose solution to citric acid.

3. A process for producing citric acid comprising mold fermenting a disaccharide solution to citric acid, withdrawing the citric acid from under the developed mycelium, introducing a monosaccharide solution under said mycelium, fermenting said solution to citric acid and withdrawing the same, introducing several successive batches of a monosaccharide solution under said mycelium, fermenting said batches to citric acid and withdrawing batches of citric acid respectively.

4. A process for producing citric acid comprising mold fermenting a sucrose solution to citric acid, withdrawing citric acid from under the developed mycelium and introducing a glucose solution under the mycelium, fermenting said solution to citric acid and withdrawing the same, introducing several successive batches of a glucose solution and fermenting and withdrawing batches of citric acid respectively.

5. A process according to claim 4 wherein the concentration of the sucrose solution and of the glucose solution is approximately 15% respectively.

6. A process according to claim 4 wherein nutrient salts are added to each of the sucrose and glucose solutions.

7. A process according to claim 4 wherein the glucose is a refined corn sugar containing about 92 to 96% glucose.

JUSTIN ZENDER.